United States Patent [19]
Ando et al.

[11] Patent Number: 5,649,235
[45] Date of Patent: Jul. 15, 1997

[54] CAMERA WITH MOLDED RESIN AND LEATHER EXTERIOR

[75] Inventors: Hiroyuki Ando, Hachioji; Kazuo Yamamoto, Tama, both of Japan

[73] Assignee: Olympus Optical Co., Ltd., Tokyo, Japan

[21] Appl. No.: 524,801

[22] Filed: Sep. 7, 1995

[30] Foreign Application Priority Data

Sep. 21, 1994 [JP] Japan .................................. 6-227102

[51] Int. Cl.$^6$ ................................................. G03B 17/02
[52] U.S. Cl. .............................................. 396/6; 396/535
[58] Field of Search ........................ 354/75, 76, 288; 264/46.4, 46.5, 46.6; 396/6, 429, 535, 541

[56] References Cited

U.S. PATENT DOCUMENTS

| | | | |
|---|---|---|---|
| 4,849,145 | 7/1989 | Hirsch | 264/46.4 |
| 5,356,576 | 10/1994 | Fischbach | 264/40.4 |

*Primary Examiner*—Howard B. Blankenship
*Attorney, Agent, or Firm*—Louis Weinstein

[57] ABSTRACT

A camera which has an exterior component formed into one piece from a leather material and a resin material. Further, on a surface portion of this exterior component, a groove having a depth in a direction nearly normal or perpendicular thereto is formed in a border line portion between the leather material and the resin material. Moreover, in a mold for forming the exterior component, a projection portion is formed to cut the groove which serves as a positioning means for positioning the leather material therein.

23 Claims, 4 Drawing Sheets

CAMERA WITH MOLDED RESIN AND LEATHER EXTERIOR

BACKGROUND OF THE INVENTION

1. Field of the Invention

The present invention generally relates to a camera, and more particularly to a camera which has an exterior part or component formed in one piece from leather and resin materials.

2. Description of the Related Art

Hitherto, there has been generally put to practical use a camera having an exterior component, on the surface of which, for example, a leather material such as real leather, synthetic leather and artificial leather is applied as a decoration by using, for instance, an adhesive agent, an adhesive double coated tape or the like in the case where the exterior component is decorated.

Further, in recent years, there has generally come into widespread use an exterior component made of a resin material, for example, a plastic material. Moreover, there have been put to practical use various kinds of decorations obtained by performing surface treatments, such as a mat finish, a burnishing, a coating or the like, on the surface of an exterior component of a camera.

However, as above described, conventional means, which is operative to stick a leather material such as real leather, synthetic leather, and artificial leather on the surface of an exterior component of a camera by using an adhesive agent, an adhesive double coated tape or the like, has drawbacks in that the leather material such as real leather, synthetic leather or artificial leather, stuck on the exterior component of the camera peels off in a use environment, for example, in the case where the exterior component of the camera is left in an environment of high temperature and high humidity for a long period of time, and that a part of the binding portion between the leather material and the exterior component of the camera sometimes rises or peels off. Moreover, in the case where the exterior part or component of the camera is of a partly narrowed shape, for example, a shape having a curve like the front or rear side edge of the camera, the sticking of the leather material on the surface of the exterior component is difficult owing to the elasticity of the leather material itself, namely, what is called the flexibility or pliancy of the leather material. Furthermore, even if the leather material is stuck thereon, there is a possibility that the leather material may peel off with the passage of time.

Additionally, if the exterior component of the camera is made of a resin material and the means for performing the surface treatments, such as a mat finish, a burnishing, a coating or the like, on the surface of the exterior component is used, the texture of the surface portion of the exterior component of the camera becomes hard. Thus, the exterior component of the camera can not obtain a soft texture or the like which should be obtained by using, for instance, the leather material or the like. Further, the treated surface of the exterior component is easily damaged. Therefore, a separate soft case is necessary for storing and carrying the camera.

OBJECTS AND SUMMARY OF THE INVENTION

Accordingly, an object of the present invention is to provide a camera having an exterior component made of a resin material, which can obtain a texture similar to that of a leather material such as real leather, synthetic leather and artificial leather and can be soft or pleasant to the touch.

Further, another object of the present invention is to provide a camera having an exterior component made of a resin material, which is formed in such a manner as to be integral with a leather material, such as real leather, synthetic leather and artificial leather, so as to harmonize the exterior component thereof with a case thereof and to obviate the need for a soft case or the like thereof.

Moreover, still another object of the present invention is to provide a camera which can easily obtain a leather exterior decoration even if an exterior component thereof is of a partly narrowed shape.

In brief, to achieve the foregoing object, in accordance with an aspect of the present invention, there is provided a camera which has an exterior component formed into one piece from a leather material and a resin material. Further, on a surface portion of this exterior component, a groove having a depth nearly normal or perpendicular to the surface of the exterior component is formed in a border line portion, namely, a boundary portion between a leather portion and a resin portion. Moreover, in a mold for forming the exterior component, a projection portion is formed to provide the groove which serves as a positioning means for positioning the leather portion therein.

Thus, in the case of the camera of the present invention, the exterior part thereof is formed in one piece from the leather material and the resin material. Thereby, the leather portion can be securely fixed onto the surface of the exterior part of the camera. Moreover, the exterior part thereof is covered with the leather material. As a result, the camera can have a high-quality texture and can be soft to the touch.

Moreover, simultaneously with this, the entire surface of the exterior component of the camera can be covered with the leather material. Consequently, the camera, which does not require a separate soft case even when stored or carried, can be obtained.

Other features, objects and advantages of the present invention will become apparent from the following description of preferred embodiments with reference to the drawings in which like reference characters designate like or corresponding parts throughout several views.

DETAILED DESCRIPTION OF THE PREFERRED EMBODIMENTS

Hereinafter, the preferred embodiments of the present invention will be described in detail by referring to the accompanying drawings.

Figure 1:
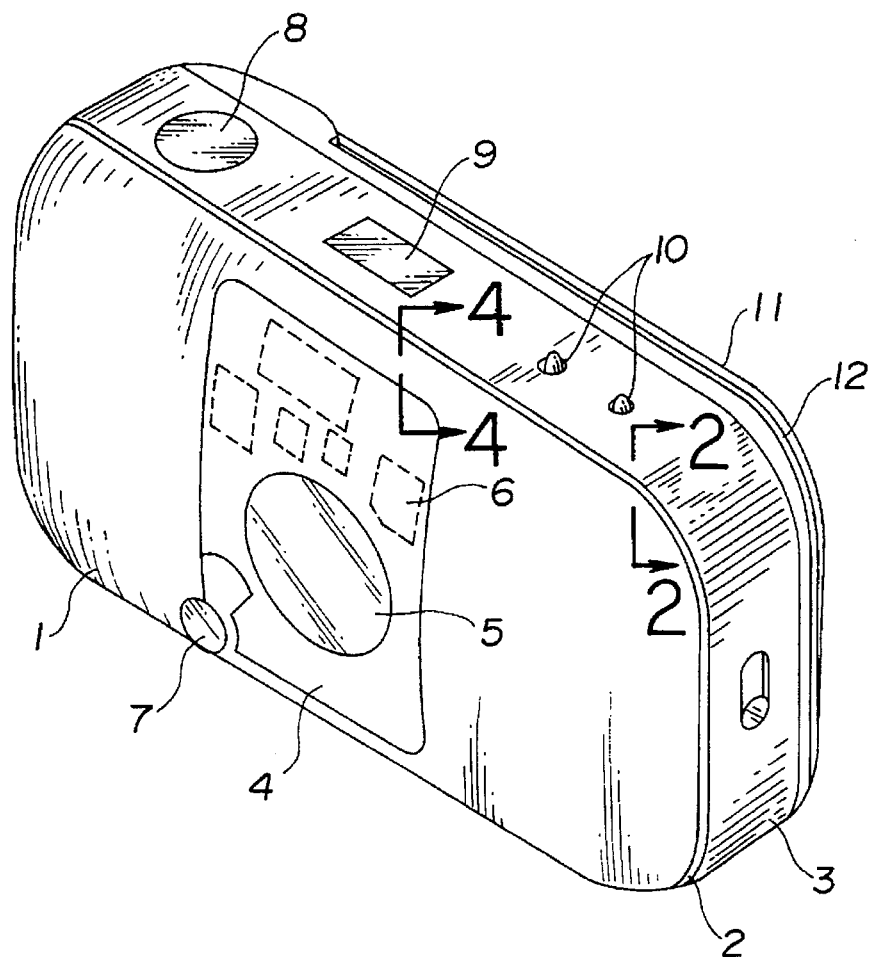
FIG. 1 is a schematic perspective diagram for illustrating the external configuration of a camera embodying the present invention, namely, a first embodiment of the present invention.

As shown in FIG. 1, an exterior part or component 3 of a camera is made of, for example, a resin material such as a plastic material. Further, on the front-surface side of the exterior component 3 of the camera, a leather portion 1 made of a leather material such as real leather, synthetic leather or artificial leather is formed in such a manner that the resin portion made of the resin material and the leather portion 1 are formed into one piece by performing, for instance, an injection molding or the like, and that a groove 2 forms a boundary line portion between the resin portion and the leather portion. Moreover, similarly with this, on the rear-surface side of the exterior component 3 of the camera, a leather portion 11 made of the leather material is formed in such a manner that the resin portion and the leather portion 11 are formed into one piece by performing, for instance, an injection molding or the like, and that a groove 12 forms a boundary line portion between the resin portion and the leather portion 11.

Furthermore, in the top, bottom and side-surface portions of the exterior part 3, the resin material is exposed to the outside. Incidentally, the groove 2 formed in the boundary line portion between the leather portion made of the leather material and the exterior component 3 made of the resin material, as well as the groove 12 formed in the boundary line portion between the leather portion 11 made of the leather material and the exterior component 3, has a depth in a direction which is nearly perpendicular to the surface of the exterior component 3.

Additionally, a panel 4 is fitted into the central part of the front-surface portion of the exterior component 3 of the camera. Further, a hole portion corresponding to the panel 4 is formed in the leather portion 1 so that the panel 4 is exposed to the outside.

For example, a photographing lens 5, a window portion 6 of each of an automatic focusing (AF) distance measuring portion and a stroboscopic light emitting portion, and a power switch and so forth are placed on the panel 4 which is provided on the front surface of the camera. Further, for instance, a release button 8, a window 9 for indicating the number of frames and an operating mode, and a mode switching button 10 and so on are placed on the top surface of the exterior component 3 of the camera.

Figure 2:
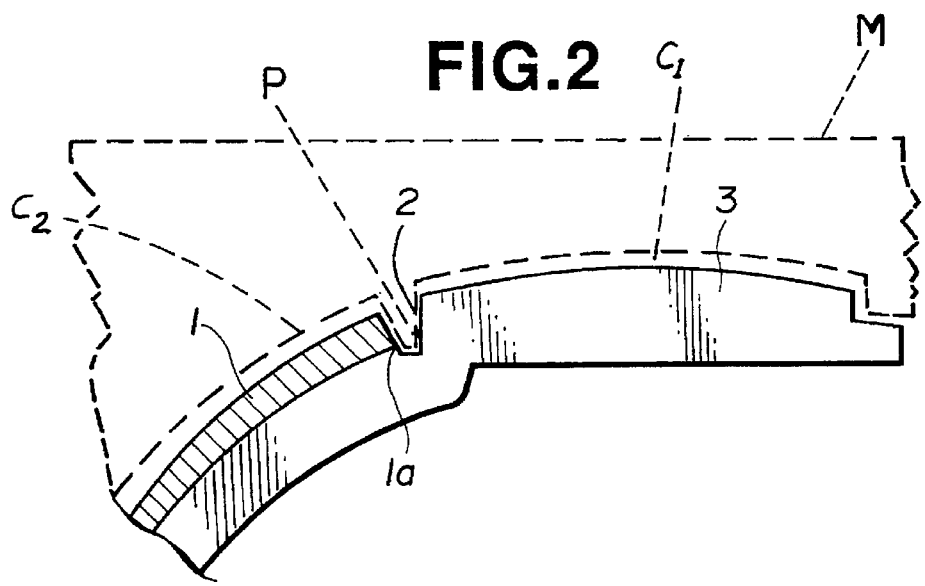
FIG. 2 is a sectional view of a part of the camera of FIG. 1, which is in the vicinity of a border line between a leather portion and a resin portion thereof, taken on line 2—2 of FIG. 1.

FIG. 2 is a diagram for illustrating the shape of a part of the camera of FIG. 1, which is in the vicinity of the border line between the leather portion 1 made of the leather material and the exterior component 3 made of the resin material. For brevity of drawing, the members provided on the rear-surface side of the camera are not shown in this figure.

As shown in this figure, an edge part 1a of the leather portion 1 is extended or contracted from a predetermined position owing to variation in length thereof occurring when integrally molded. Thus, undulations or the like occur in the boundary portion between the edge part 1a and the resin portion, namely, in a portion, in which the groove 2 should be cut, of the leather portion 1. Therefore, the groove 2 is formed therein so as to make the undulations unnoticeable.

Further, in a mold for forming the exterior component 3, a projection portion having a rib-like shape is formed correspondingly to the groove 2. When the resin portion of the exterior component and the leather portion 1 are formed into one piece, the projection portion also acts as a positioning means for regulating the position of the edge part 1a of the leather portion. A portion of a mold M, is shown in FIG. 2, for forming the leather resin structure shown therein, the mold portion M having curved portions C1 and C2 conforming to the curved contours of exterior element 3 and leather member 1 and further having a projection P which forms the groove 2 in the molded member.

Figure 3:
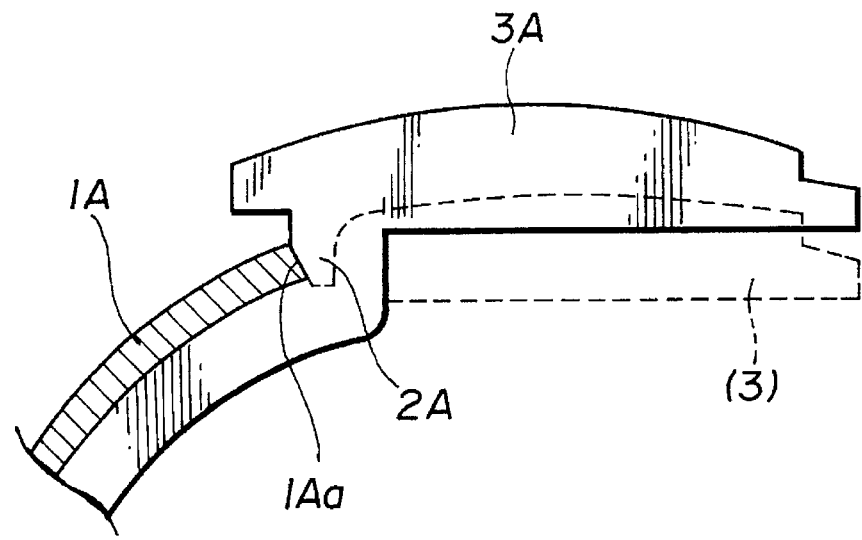
FIG. 3 is a diagram for illustrating a general means tried or provided for processing a border line portion between the leather portion and the resin portion.

Meanwhile, a general means tried or provided for processing a border line portion between the leather portion and the resin portion is illustrated in FIG. 3. In this figure, the shape of the top portion of the exterior component 3 of FIG. 2 is indicated by dashed lines and curves for comparison.

Moreover, in this figure, the members provided on the rear-surface side of the camera are not shown for simplicity of drawing.

As illustrated in this figure, a past of the exterior component 3A, which is made of the resin material, fills up a space corresponding to a groove 2A in such a way as to cover an edge part 1Aa of a leather portion 1A. In the case of employing such a means, the outward appearance of the exterior component 3A varies largely depending upon a manner in which the filling-up operation is performed along the groove 2A. Moreover, the outer dimensions of the exterior component 3A become large.

Thus, in the case of the first embodiment of the present invention, the groove 2 is provided in the boundary line portion between the leather portion 1 and the resin portion of the exterior component 3 as described with reference to FIG. 2. Thereby, the undulations are made to be unnoticeable. Moreover, the appearance or exterior decoration of the camera is prevented from being spoiled.

Figure 4:
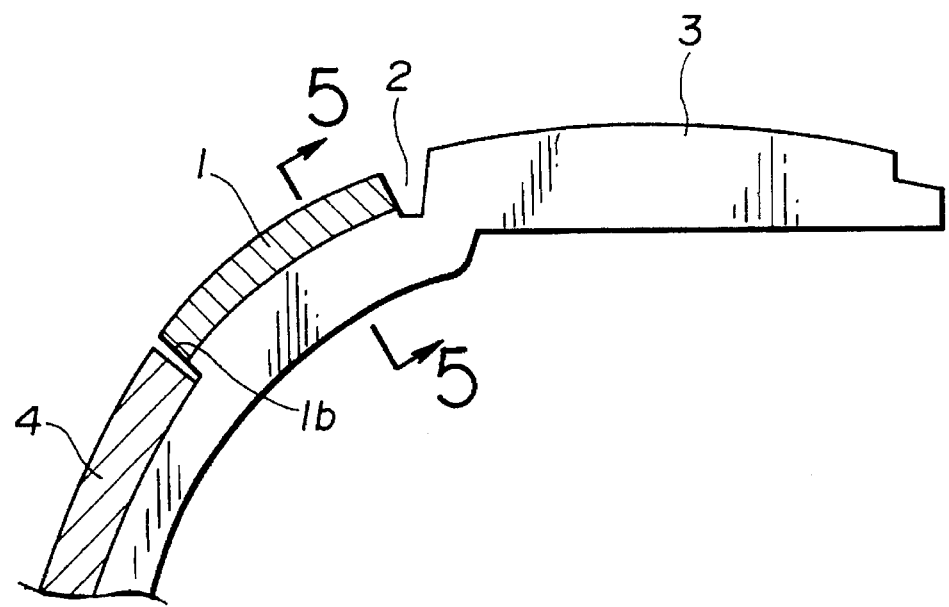
FIG. 4 is a sectional view of a part of the camera of FIG. 1, which is in the vicinity of a border line between the leather portion and a panel thereof, taken on line 4—4 of FIG. 1.

Further, FIG. 4 is a diagram for illustrating the shape of a part of the camera, which is in the vicinity of the border line between the leather portion and the panel 4 thereof. In this figure, the members provided on the rear-surface side of the camera are not shown for simplicity of drawing.

As shown in this figure, an edge part 1b of a hole portion corresponding to the panel 4 of the leather portion 1 becomes a positioning means for positioning the leather portion 1 and the resin portion of the exterior component 3 when integrally molded. Similarly as in the case of the edge part 1a of the leather portion 1 described above with reference to FIG. 3, the edge part 1b is also extended or contracted from the predetermined position owing to variation in length thereof occurring when integrally molded. Thus, undulations or the like occur in the boundary portion between the edge part 1b and the resin portion, namely, in a portion, in which the groove 2 should be cut, of the leather portion 1. Therefore, the panel 4 is formed therein so as to make the undulations unnoticeable.

Figure 5:
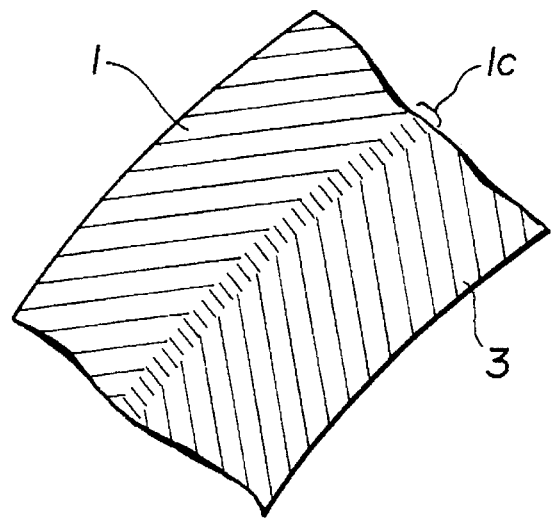
FIG. 5 is an enlarged sectional view of a primary part of the camera of FIG. 1, whose exterior component is formed into one piece from a leather material and a resin material, taken on line 5—5 of FIG. 4.

Further, FIG. 5 is a diagram for illustrating a manner in which the exterior component 3 is formed into one piece from the leather portion 1 and the resin portion. In this figure, the members provided on the rear-surface side of the camera are not shown for simplicity of drawing.

As illustrated in FIG. 5, a fiber layer 1c of the surface part of the leather portion 1, which is made on the side of the surface thereof facing the resin portion of the exterior component 3, is positively formed on the resin layer of the exterior component 3 when the leather portion 1 made of the leather material and the resin portion of the exterior component 3, which is made of the resin material, are formed into one piece.

Namely, when the leather portion 1 and the resin portion of the exterior component 3 are formed into one piece, a dissolved resin material is twined around the fiber layer 1c by an injection pressure and thus becomes hard. Thereby, the leather portion 1 formed on the resin portion of the exterior component 3 in such a manner as to be integral therewith is securely fixed to the surface of the resin portion thereof.

As described above, in the case of the first embodiment, the leather portion 1 and the resin portion of the exterior component 3 are formed in such a manner as to be integral with each other. Thereby, the leather portion 1 formed on the resin portion of the exterior component 3 in such a manner as to be integral therewith can be securely fixed to the surface of the resin portion thereof without a fear of the peeling-off of the leather portion 1 from the surface of the resin portion of the exterior component 3.

Moreover, because the exterior component 3 is integrally molded from the leather portion 1 and the resin portion thereof in the case of this embodiment of the present invention, the present invention obviates the necessity of the step of sticking the leather material or the like to the resin portion of the exterior component 3 while positioning the leather portion after the resin portion of the exterior component is produced, which would be required in the case of the conventional means. This can contribute to reduced manufacturing costs of cameras.

Further, the leather portion 1 can be surely formed on the resin portion of the exterior component 3 irrespectively of the shape of the members of the exterior component 3 by forming the leather portion 1 and the resin portion of the exterior component 3 into one piece. Namely, in the case where a leather material or the like is stuck on an exterior component of a spherical shape by using an adhesive agent, an adhesive double coated tape or the like similarly as in the case of the conventional camera, for example, when the leather material or the like is given to the exterior component of such a shape, the leather portion becomes liable to peel away from the surface of the exterior component, owing to the flexibility and the expanding and contracting actions of the leather material. However, what is called the die transfer precision of the leather material is enhanced as the result of forming the leather portion 1 and the resin portion of the exterior component 3 into one piece as described above. Thus, the leather material can be easily adapted to the resin portion of an exterior component, which has a curved surface. Therefore, in the case where the exterior component has a spherical member or the like, a leather material can be easily processed into a part of the exterior component.

Further, various kinds of variations of an exterior component can be easily produced by using various leather materials, which are different in textures and colors from one another, by means of the same die.

Furthermore, in the case of this embodiment, the leather portion 1 and the resin portion of the exterior component 3 are formed into one piece through the fiber layer 1c. Thus, this embodiment does not undergo an occurrence of unevenness in sticking the leather portion 1 to the resin portion of the exterior component 3, which would occur in the case of the conventional camera because of the presence of air between the leather portion 1 and the resin portion of the exterior component 3. Thereby, the leather portion 1 can be securely fixed onto the resin portion of the exterior component 3. Consequently, the appearance or exterior decoration of the camera is not spoiled.

Figure 6:
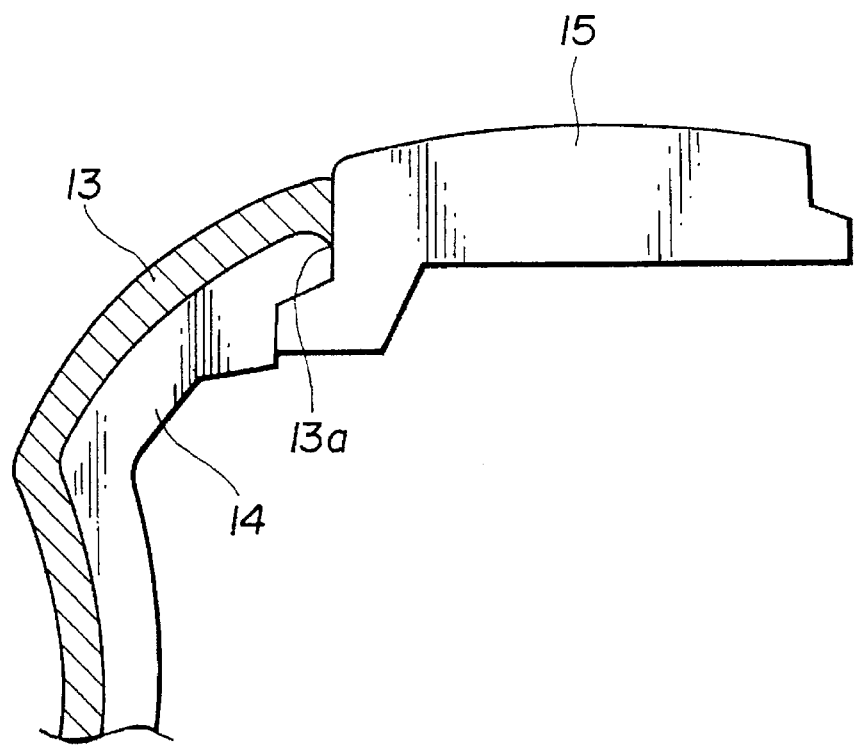
FIG. 6 is a sectional view of an exterior component of another camera embodying the present invention, namely, a second embodiment of the present invention, which is formed into one piece from a leather material and a resin material.

Next, a second embodiment of the present invention will be described hereinbelow. Incidentally, the configuration of the second embodiment is basically similar to that of the first embodiment described hereinabove. Therefore, regarding the entire perspective view of a camera of the second embodiment, refer to FIG. 1. Further, FIG. 6 is a sectional view of an exterior component of another camera embodying the present invention, namely, a second embodiment of the present invention. In this figure, the members provided on the rear-surface side of the camera are not shown for simplicity of drawing.

In the case of the aforementioned first embodiment, the undulations generated on the border line between the leather portion 1 and the resin portion of the exterior component 3 are made to be unnoticeable by providing the groove 2 therein. In the case where the leather portion 1 and the resin portion of the exterior component 3 are formed into one piece, when the shape of the surface portion of the exterior component 3 formed from the leather material becomes complex, the variation in length or size of the leather portion 1 owing to the extension and contraction of the leather material, which occur when the exterior component 3 is integrally molded, becomes larger. Thus, there is a possibility that even if the groove 2 is provided in the exterior component 3, it becomes difficult to deal with such variation within the range of the groove 2.

Accordingly, this second embodiment is created so as to make the undulations unnoticeable even in the case where the variation in length or size of the leather portion becomes large when the exterior component is integrally molded from the leather material and the resin material.

Namely, in the case of the second embodiment, as illustrated in FIG. 6, an exterior component 14 consisting of a leather portion 13 made of a leather material and a resin portion made of a resin material, which are formed into one piece by performing, for example, an injection molding, is placed on the front surface of the camera. Moreover, another exterior component 15 made only of a resin material is placed on the top surface of the camera.

With such a configuration, the second embodiment can obtain effects or advantages similar to those of the aforementioned first embodiment. Additionally, the undulations or the like generating in an edge part 13a of the leather portion 13 can be made to be unnoticeable.

Next, a third embodiment of the present invention will be described hereinbelow. In the case of this third embodiment, an additional exterior component constituted by a member integrally molded from a leather material and a resin material is employed instead of the exterior component 15 made only of the resin material as in the case of the second embodiment.

Figure 7:
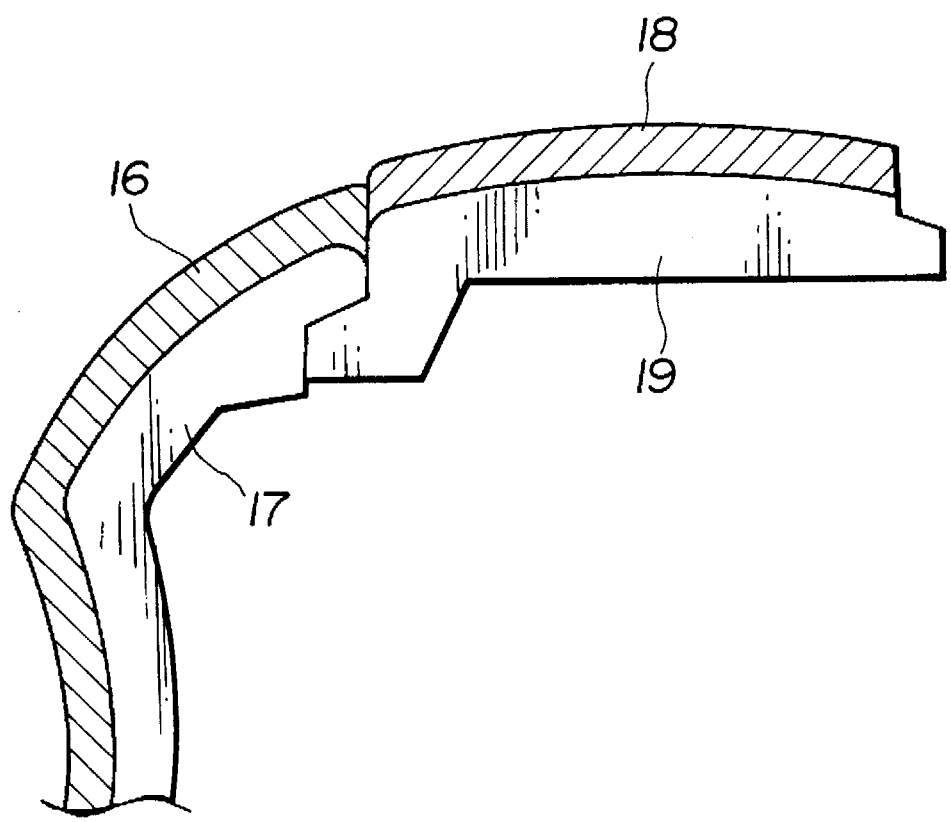
FIG. 7 is a sectional view of an exterior component of still another camera embodying the present invention, namely, a third embodiment of the present invention, which is formed into one piece from a leather material and a resin material.

Namely, as shown in FIG. 7, an exterior component 14 consisting of a leather portion 16 made of a leather material and a resin portion 17 made of a resin material, which are formed into one piece by performing, for example, an injection molding, is placed on the front surface of a camera of the third embodiment. Moreover, the additional exterior component made of a leather portion 18 made of a leather material and a resin portion 19 made of the resin material, which are formed into one piece by performing an injection molding or the like, is placed on the top surface of the camera.

With such a configuration, the third embodiment can obtain effects or advantages quite similar to those of the aforementioned first and second embodiments. Moreover, the entire surface of the exterior of the camera is decorated with a leather exterior decoration by constructing the exterior of the camera of the combination of exterior components, each of which is integrally molded from the leather material and the resin material. Therefore, the third embodiment can obviate the necessity of a soft case or the like by decorating the exterior of the camera with the leather material and moreover harmonizing the exterior components with a case in the cases of storing and carrying the camera.

Although the preferred embodiments of the present invention have been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. A camera having an exterior component, the exterior component comprising:

a leather portion made of a leather material; and resin portion made of a resin material, wherein the leather portion and the resin portion are integrally formed into one piece, and a groove having a depth which extends in a direction substantially perpendicular to a surface of the exterior component is formed in a boundary portion between in edge of the leather portion and the resin portion of the exterior component in a surface portion thereof to space adjacent edges of said leather portion and said resin portion at the surface of the exterior component from one another.

2. The camera according to claim 1, wherein the leather portion has one of a curved configuration and a spherical configuration.

3. The camera according to claim 2 wherein the groove is formed by using a mold in which a projection portion serving as both a means for forming the groove and a positioning means for positioning the leather portion therein is formed, whereby said edge of said leather portion engages said projection.

4. The camera according to claim 1, wherein the leather material is genuine leather.

5. The camera according to claim 1, wherein the leather material is artificial leather.

6. The camera according to claim 1, wherein the leather material is synthetic leather.

7. The camera according to claim 1, wherein the resin material is a plastic material.

8. The camera according to claim 1, wherein the leather portion and the resin portion are formed into one piece by performing an injection molding.

9. The camera according to claim 1, wherein at least one hole is formed in the leather portion.

10. The camera according to claim 9, wherein at least an objective optical system of a photographic lens is positioned within a region of said hole.

11. A camera having an exterior component, the exterior component comprising:

a flexible portion which is made of a flexible material and has a curved shape;

a resin portion which is made of a resin material and is formed in such a manner as to be integral with the flexible portion; and wherein a groove having a depth in a direction substantially perpendicular to a surface of the exterior component is formed in a boundary portion between the flexible portion and the resin portion in the surface portion thereof so as to separate adjacent edges of the resin portion and the flexible portion at the surface of the exterior component from one another.

12. The camera according to claim 11, wherein the groove is formed by using a mold in which a projection portion serving as both a means for forming the groove and a positioning means for positioning the flexible portion therein is formed.

13. The camera according to claim 11, wherein the flexible material is genuine leather.

14. The camera according to claim 11, wherein the flexible material is artificial leather.

15. The camera according to claim 11, wherein the flexible material is synthetic leather.

16. The camera according to claim 11, wherein the resin material is a plastic material.

17. The camera according to claim 11, wherein the flexible portion and the resin portion are formed into one piece by performing an injection molding.

18. The camera according to claim 11, wherein at least one hole is formed in the flexible portion.

19. The camera according to claim 11, wherein at least one of an objective optical system of a photographic lens, an objective optical system of a finder, an eyepiece optical system of the finder, a display portion of an external display unit and an operating member thereof is placed in a part thereof, which is not covered with the flexible material.

20. A method for producing an exterior component of a camera comprising the steps of:

providing a leather portion made of a leather-like material;

forming a resin portion made of a resin material, wherein the leather portion and the resin portion are formed in one piece by an injection molding process; and providing a groove extending into a surface of the exterior component which separates an edge of the resin along one side of the groove from an edge of the leather portion lying on an opposite side of the groove.

21. A method for producing an exterior component of a camera comprising the steps of:

providing a leather portion made of a leather-like material;

forming a resin portion made of a resin material, wherein the leather portion and the resin portion are formed in one piece by an injection molding process; and forming the resin and leather portion in one piece by dissolving a resin material and twining the resin material around a fiber layer using injection pressure whereby adjacent edges of the resin material and the leather-like material are integrally joined.

22. The method of claim 20 further comprising the step of forming a groove between an edge of the leather and a surface of the resin material adjacent to the edge of the leather.

23. A method for producing an exterior component of a camera comprising the steps of:

providing a contoured surface in a mold member for defining an exterior component of a camera;

forming a projecting rib in said mold member;

positioning a leather portion in said mold member so that an edge thereof engages one side of said projection;

introducing a resin into said mold member whereby the resin material is placed over an exposed surface of the leather portion and covers said projection to form the exterior component of the camera of a composite leather portion and resin portion wherein the leather portion and resin portion are integrally joined to one another along said exposed surface of said leather portion and wherein said projection forms a groove in said exterior component which spaces the edge of the leather portion placed against the projecting rib of the mold member from an edge of the resin material adjacent to said edge of said leather portion.

* * * * *